United States Patent [19]
Hara et al.

[11] Patent Number: 4,721,144
[45] Date of Patent: Jan. 26, 1988

[54] PNEUMATIC RADIAL TIRES FOR PASSENGER CARS

[75] Inventors: Hideo Hara; Motonori Bundo, both of Tokyo; Yoshihiro Makino, Kodaira, all of Japan

[73] Assignee: Bridgestone Corporation, Tokyo, Japan

[21] Appl. No.: 721,726

[22] Filed: Apr. 10, 1985

[30] Foreign Application Priority Data

Apr. 10, 1984 [JP] Japan .................. 59-69913

[51] Int. Cl.$^4$ .......................... B60C 15/06; B60C 9/08
[52] U.S. Cl. .................... 152/541; 152/546; 152/547; 152/552; 152/560
[58] Field of Search ............ 152/541, 539, 546, 547, 152/526, 531, 535, 548, 552, 554, 556, 558, 560, 564

[56] References Cited

U.S. PATENT DOCUMENTS

| | | | |
|---|---|---|---|
| 4,067,373 | 1/1978 | Delobelle et al. | 152/547 X |
| 4,289,184 | 9/1981 | Motomura et al. | 152/541 |
| 4,349,061 | 9/1982 | Hirakawa et al. | 152/541 X |
| 4,513,802 | 4/1985 | Togashi et al. | 152/541 X |

FOREIGN PATENT DOCUMENTS

| | | |
|---|---|---|
| 0124617 | 11/1984 | European Pat. Off. . |
| 2111886 | 6/1972 | France . |
| 2329465 | 5/1977 | France . |
| 2039257 | 8/1980 | United Kingdom . |
| 2057369 | 4/1981 | United Kingdom . |

Primary Examiner—Donald E. Czaja
Assistant Examiner—Thomas Bokan
Attorney, Agent, or Firm—Sughrue, Mion, Zinn, Macpeak & Seas

[57] ABSTRACT

A pneumatic radial tire for passenger car having an improved riding comfort against vibration without substantially degrading the cornering stability is disclosed, which comprises a bead filler disposed between the carcass and its turnup, at least a part of which has a complex modulus of elasticity of $1 \times 10^8 \sim 8 \times 10^8$ dyn/cm$^2$ and a sin δ of not less than 0.28 under a strain energy of $10^4$ dyn/cm$^2$.

4 Claims, No Drawings

PNEUMATIC RADIAL TIRES FOR PASSENGER CARS

BACKGROUND OF THE INVENTION

1. Field of the Invention

This invention relates to a pneumatic radial tire for passenger cars, and more particularly to an improvement of a bead filler in the pneumatic radial tire for passenger cars which provides a good balance of cornering stability, riding comfort against vibration and noise by selecting appropriate properties of the bead filler without degrading general performance required in the tire of this type, particularly the cornering stability.

2. Description of the Prior Art

In this type of the pneumatic radial tire for passenger cars, it is required that a bead filler having an extremely high hardness and a substantially triangular shape in section be disposed between a carcass of a radial core structure and a turnup thereof wound around a bead core over a region extending from a position just above the bead core to a position substantially corresponding to a maximum width of the tire. The filler is employed in order to improve the cornering stability. In this connection, the use of the bead filler made of a superhard rubber stock is well-known, for example, from Japanese Utility Model Publication No. 47-16,084, French Patent Specification No. 1,260,138, U.S. Patent Specification No. 4,067,373 and the like.

Radial tires for passenger cars are known to have excellent riding comfort against vibration and noise and the like in addition to the cornering stability, unlike tires for truck and bus.

However, the cornering stability and the riding comfort against vibration are generally conflictive to each other. In the conventional radial tire for passenger car, therefore, either the cornering stability or the riding comfort is sacrificed, or both the performances are simply balanced at a low level.

SUMMARY OF THE INVENTION

It is an object of the invention to eliminate the aforementioned drawbacks of the prior art and to improve riding comfort against vibration in the radial tire for passenger cars without substantially deteriorating cornering stability.

It is another object of the invention to advantageously attain improvement of riding comfort against vibration without losing the overall balance of the required performance.

It is a further object of the invention to provide a technique for highly balancing the performances required in the radial tire for passenger car such as cornering stability, riding comfort against vibration and the like.

The inventors have aimed at the bead portion giving a bad influence on the riding comfort against vibration in order to achieve these objects and made various studies with respect to the behaviors on stress and strain of the bead portion during the rotation of the tire, particularly the viscoelastic behavior of bead filler as well as the relation of these behaviors to the cornering stability and riding comfort against vibration. As a result, it has been found that not only the simple stress or strain of the bead filler but also the strain energy and viscoelastic properties corresponding thereto are greatly related to the above performances and further that the above objects of the invention are advantageously satisfied by controlling the viscoelastic properties.

According to the invention, there is provided in a pneumatic radial tire for passenger car comprising a carcass of a radial ply cord structure wound around each of bead cores from inside toward outside to form a turnup, and a bead filler disposed just above the bead core between the carcass and the turnup thereof, the improvement wherein at least a part of the bead filler is composed of a rubber composition having a complex modulus of elasticity of $1 \times 10^8 \sim 8 \times 10^8$ dyn/cm$^2$ and a sin $\delta$ of not less than 0.28 under a strain energy of $10^4$ dyn/cm$^2$.

DETAILED DESCRIPTION OF THE INVENTION

The term "complex modulus of elasticity, E*" used herein means a value measured at 25° C. and 50 Hz under a periodic strain $\epsilon$ of 1%. According to the invention, the complex modulus of elasticity is necessary to be $1 \times 10^8 \sim 8 \times 10^8$ dyn/cm$^2$. Further, it is necessary that sin $\delta$ is not less than 0.28 under a strain energy of $10^4$ dyn/cm$^2$ represented by $\frac{1}{2}E^* \cdot \epsilon^2$, where $\delta$ is a phase angle between periodic strain $\epsilon$ and stress $\sigma$. Moreover, E* is preferably $3 \times 10^8 \sim 7 \times 10^8$ dyn/cm$^2$, while sin $\delta$ is preferably 0.30~0.50, more particularly 0.32~0.45.

When E* is less than $1 \times 10^8$ dyn/cm$^2$, the rigidity of the bead portion lowers to degrade the cornering stability, and at the same time the strain of the bead portion during the rotation of the tire becomes larger to adversely affect durability. However, when E* exceeds $8 \times 10^8$ dyn/cm$^2$, even if sin $\delta$ is not less than 0.28, the improving effect of riding comfort against vibration is small.

On the other hand, when sin $\delta$ is less than 0.28, the improving effect of riding comfort against vibration is small.

The factors acting to the riding comfort are primarily vibration and noise of the tire. Particularly, the noise includes harshness of not more than about 100 Hz and road noise of about 100~400 Hz.

It should be noted that the use of the bead filler composed of rubber composition having properties defined in the invention develops a unique effect of reducing not only vibrations but also noises.

Incidentally, the combination of high modulus (hard) rubber and low modulus (soft) rubber or so-called hard and soft composite bead filler is usually used as a method of improving the riding comfort against vibration without substantially degrading the cornering stability. When the bead filler according to the invention is applied to the soft bead filler portion of the hard and soft composite bead filler, the object of the invention can advantageously be achieved.

In such a hard and soft composite bead filler, it is desirable that the complex modulus of elasticity in hard bead filler portion E* (hard) and the complex modulus of elasticity in soft bead filler portion E* (soft) satisfy the following relation:

$$E^*(\text{hard}) - E^*(\text{soft}) \geq 3 \times 10^8 \text{ dyn/cm}^2.$$

When such a difference in complex modulus of elasticity is less than $3 \times 10^8$ dyn/cm$^2$, there is no meaning in the use of the hard and soft composite bead filler and the improving effect is small in view of the fact that the cornering stability and the riding comfort against vibration should be balanced at a higher level.

The following examples are given in illustration of the invention and are not intended as limitations thereof.

EXAMPLE 1

Two kinds of radial tires for passenger cars with a tire size of 165 SR 13, each comprising a combination of a carcass composed of a single ply containing polyethylene terephthalate fiber cords of 1500 d/2 therein with a belt composed of two steel cord layers, were provided by using bead filler rubbers according to the invention and the prior art having properties as shown in the following Table 1, respectively.

After each of the above two tires was mounted on a passenger car A, the feeling test for the cornering stability and the riding comfort against vibration was made by a professional driver.

Moreover, these properties were evaluated as an index on the basis that the value of the prior art tire is 100 under the following evaluation standard contrary to the prior art tire:
0: unchanged
+2: slightly changed
+4: slightly good
+8: good The thus obtained results are shown in Table 1.

TABLE 1

|  | Prior art tire | Invention tire |
| --- | --- | --- |
| $E^*$ ($\times 10^8$ dyn/cm$^2$) | 5.1 | 5.0 |
| sin δ | 0.16 | 0.41 |
| Cornering stability | 100 | 100 |
| Riding comfort against vibration | 100 | 107 |

Then, each of the above tires was run on a steel drum under such a condition that strain energy concentrating in the end of the carcass turnup is about 4 times strain energy produced during the actually running, whereby a running distance until the occurrence of failures in the turnup end was measured.

In both the tires, the occurrence of failures was not observed after the tire was run over a distance of 20,000 km, so that the test was stopped at the running distance of 20,000 km.

The above results show that the use of the bead filler according to the invention advantageously improves the riding comfort against vibration without substantially degrading the cornering stability and durability.

EXAMPLE 2

A radial tire for passenger car with a tire size of 155 SR 13 having the same structures of the carcass and belt as in Example 1 and the properties of the bead filler as shown in the following Table 2 was provided and then subjected to the following test to obtain results as shown in Table 2.

(1) After the tire was mounted on a testing machine for the measurement of cornering properties, the cornering power, maximum cornering force and maximum self-aligning torque were measured in the usual manner; and (2) The tire was mounted on a passenger car B and run at a speed of 50 km/hr, during which road noise inside the car was measured by means of a noise meter.

TABLE 2

|  | Prior art tire | Invention tire |
| --- | --- | --- |
| $E^*$ ($\times 10^8$ dyn/cm$^2$) | 8.5 | 4.8 |
| sin δ | 0.22 | 0.43 |
| Cornering properties |  |  |
| cornering power (kg/deg) | 56.9 | 56.3 |
| maximum cornering force (kg) | 266.4 | 267.2 |
| maximum self-aligning torque (kg · m) | 5.2 | 5.2 |
| Road noise (dbA) |  |  |
| less than 100 Hz | 63.5 | 61.8 |
| 100~500 Hz | 69.2 | 68.8 |

It is obvious from the data of Table 2 that the bead filler according to the invention advantageously reduces the noises without substantially degrading the cornering properties.

EXAMPLE 3

A radial tire for passenger car with a tire size of 155 SR 13 having the same structures of the carcass and belt as in Example 1 was provided, in which the bead filler had a substantially isosceles triangle having a height of 40 mm and a bottom side located along the bead core of 5 mm and was composed of a hard rubber stock extending just above the bead filler at a height of 15 mm and having a complex modulus of elasticity of $9.4 \times 10^8$ dyn/cm$^2$ and a soft rubber stock having the properties as shown in the following Table 3. After the tire was mounted on each of passenger cars C and D, the feeling tests for the cornering stability and riding comfort against vibration were made by a professional driver to obtain results as shown in Table 3. The evaluation standard was the same as in Example 1.

TABLE 3

|  | Prior art tire | Invention tire |
| --- | --- | --- |
| $E^*$ ($\times 10^8$ dyn/cm$^2$) | 1.6 | 5.2 |
| sin δ | 0.23 | 0.43 |
| Cornering stability (passenger car C) | 100 | 102 |
| Riding comfort against vibration (passenger car C) |  |  |
| vibration | 100 | 104 |
| noise | 100 | 102 |
| total | 100 | 103 |
| Riding comfort against vibration (passenger car D) |  |  |
| vibration | 100 | 104 |
| noise | 100 | 103 |
| total | 100 | 104 |

Moreover, road noises in the interior of the passenger car D were measured by means of a noise meter to obtain results as shown in the following Table 4. In this case, the reduction amount of noise contrast to that of the prior art tire was measured under given conditions of running road and running speed and represented by a fraction of the data at less than 100 Hz as a numerator and the data at 100~500 Hz or 30~200 Hz as a denominator.

TABLE 4

| Road noise (reduction amount of noise dbA contrast to prior art tire) | |
| --- | --- |
| Cracked road, running speed 50 km/h | ~100 Hz/100~500 Hz  −0.3/0 |

TABLE 4-continued

| Road noise (reduction amount of noise dbA contrast to prior art tire) | | |
| --- | --- | --- |
| Jointed road, running speed 50 km/h | ~30 Hz/30~200 Hz | −0.9/−0.2 |
| Jointed road, running speed 80 km/h | ~30 Hz/30~200 Hz | −1.2/0 |

The results of Tables 3 and 4 show that the relation of cornering stability, riding comfort against vibration, road noise and the like is balanced at a high level by using the bead filler according to the invention.

As mentioned above, the invention can effectively improve the riding comfort against vibration and noise of the radial tire for passenger cars without substantially degrading the cornering stability thereof.

What is claimed is:

1. In a pneumatic radial tire for a passenger car having improved riding comfort against vibration comprising; a carcass of a radial ply cord structure wound around each of bead cores from inside toward outside to form a turnup, and a bead filler disposed just above the bead core between the carcass and the turnup thereof, said bead filler comprising a hard rubber stock and soft rubber stock, the improvement in said passenger car radial tire wherein said soft rubber stock is composed of a rubber composition having a complex modulus of elasticity of $1 \times 10^8$ to $8 \times 10^8$ dyn/cm$^2$ and a sin $\delta$ of 0.3 to 0.5 under a strain energy of $10^4$ dyn/cm$^2$.

2. The pneumatic radial tire according to claim 1, wherein the complex modulus of elasticity is $3 \times 10^8$ to $7 \times 10^8$ dyn/cm$^2$.

3. The pneumatic radial tire according to claim 1, wherein the sin $\delta$ is 0.32 to 0.45.

4. The pneumatic radial tire according to claim 1, wherein the difference in complex modulus of elasticity between hard rubber stock and soft rubber stock is $E^*$ (hard) $- E^*$ (soft) $\geq 3 \times 10^8$ dyn/cm$^2$.

* * * * *